United States Patent [19]

Imanari

[11] Patent Number: 5,625,848
[45] Date of Patent: Apr. 29, 1997

[54] MULTIPLE POINT DISTANCE MEASUREMENT CAMERA WITH CORRECTION FOR ORIENTATION

[75] Inventor: Hitoshi Imanari, Yokohama, Japan

[73] Assignee: Nikon Corporation, Tokyo, Japan

[21] Appl. No.: 325,567

[22] Filed: Oct. 19, 1994

[30] Foreign Application Priority Data

Dec. 13, 1993 [JP] Japan .................... 5-341994

[51] Int. Cl.⁶ .................... G03B 7/00; G03B 7/08; G03B 13/02; G03B 13/36
[52] U.S. Cl. .................... 396/50; 396/51; 396/123; 396/234; 396/246
[58] Field of Search .................... 354/402, 403, 354/432, 106, 442; 396/50, 51, 123, 234, 246

[56] References Cited

U.S. PATENT DOCUMENTS

| | | | |
|---|---|---|---|
| 4,364,650 | 12/1982 | Terashita et al. | 354/432 |
| 5,122,827 | 6/1992 | Saegusa et al. | 354/410 |
| 5,128,702 | 7/1992 | Ogawa et al. | 354/106 |
| 5,194,892 | 3/1993 | Robison | 354/106 X |
| 5,225,862 | 7/1993 | Nagano et al. | 354/400 X |
| 5,499,074 | 3/1996 | Ohsawa et al. | 354/402 |

OTHER PUBLICATIONS

English abstract of Japanese Patent document 2-64513, Tsurekawa, Mar. 5, 1990.

Primary Examiner—W. B. Perkey
Attorney, Agent, or Firm—Oliff & Berridge

[57] ABSTRACT

A camera includes an orientation detection device that detects the orientation of the camera, a recording device that records photographic settings to be used during photography, and a camera controller. The recording device records the photographic settings relative to different orientations of the camera. The camera controller controls the camera based upon the detected orientation and photographic settings recorded in the recording device for that detected orientation.

21 Claims, 5 Drawing Sheets

MULTIPLE POINT DISTANCE MEASUREMENT CAMERA WITH CORRECTION FOR ORIENTATION

BACKGROUND OF THE INVENTION

1. Field of the Invention

This invention relates to a camera having a multiple point distance measurement area system, and, in particular, to such a camera also having an orientation detection device that determines the orientation of the camera, e.g., whether the camera is in a horizontal or vertical position.

2. Description of Related Art

Conventional cameras having a focal point detection device can measure the distance between the intended subject and the camera if the camera is positioned such that the intended subject appears within the distance measurement area 101a (FIG. 3). The distance measurement area 101a is disposed in the center of a viewfinder 101. If the intended subject is not situated within the single distance measurement area 101a, however, the camera focuses on whatever appears within the distance measurement area 101a, i.e., something other than the intended subject. In order to avoid this problem, multiple distance measurement areas 100a–100c (FIG. 4) can be provided in the viewfinder 100. An intended subject appearing in one of the multiple distance measurement areas can be photographed by selecting that particular distance measurement area.

With such a multiple point distance measurement camera, the photographer chooses a mode by which a particular distance measurement area will be designated when a photograph is taken. The photographer can choose between three possible modes: an automatic mode, a manual mode, and a line-of-sight mode. If the photographer chooses to have the distance measurement area designated according to the automatic mode, the camera will designate a particular distance measurement area (100a, 100b, or 100c) automatically based upon a known method when a photograph is taken. For example, the camera can designate one of the areas (100a–100c) that contains an object that is closest to the camera as the area to be used for focusing. Alternatively, if the photographer chooses to have the distance measurement area designated according to the manual distance measurement area selection mode, the photographer must manually designate a particular one of the distance measurement areas (100a–100c) by actuating one or more controls on the camera prior to taking a photograph. According to another alternative, if the visual line input (line-of-sight) mode is chosen by the photographer, the camera will designate the particular distance measurement area that is most closely aligned with the photographer's line-of sight according to a known method. For an example of a camera having the visual line input mode, see, for example, U.S. Pat. No. 5,225,862, the disclosure of which is incorporated herein by reference.

For the purposes of this disclosure, the orientation of the camera refers to whether the camera is being used in its landscape configuration or its portrait configuration. The landscape configuration, or horizontal position, refers to the situation in which the longer axis of the camera (i.e., the base) is positioned approximately parallel to the ground while a photograph is being taken. The portrait configuration, or vertical position, refers to the situation in which the base of the camera is approximately perpendicular to the ground when a photograph is being taken. A method of changing the control of a camera based upon its orientation is described in Japanese Laid-Open patent application No. 2-64513.

The conventional cameras, however, do not establish a particular one of the distance measurement area selection modes with respect to whether the camera is in the horizontal position or the vertical position. In other words, if the orientation of the prior art multiple point distance measurement camera is changed, the distance measurement area selection mode must also be verified or changed by the photographer. Consequently, failing to change the distance measurement area selection mode when the camera orientation is changed may result in missed opportunities or undesired photographs.

SUMMARY OF THE INVENTION

According to embodiments of the present invention, a camera having multiple point distance measurement areas is provided with an establishment device that establishes photographic settings to be used during photography, an orientation detection device that detects the orientation of the camera, and a recording device that records the photographic settings to be used during photography relative to the possible orientations of the camera. A camera controller controls the camera based upon the detected orientation and the one or more photographic settings recorded in the recording device for that detected orientation.

A particular mode of camera operation (i.e., a photographic setting) may be selected with respect to a certain orientation such that when the camera is positioned in that orientation, that particular mode becomes enabled. Consequently, the orientation of the camera can be changed without the need to verify or change the particular settings. The camera automatically uses the appropriate setting(s) when the camera orientation is changed.

The photographic settings that can be prerecorded for different camera orientations can include, for example, the distance measurement area selection mode, the exposure control mode, and the light measurement control mode. For example, the distance area selection mode can be set to the automatic mode, the manual mode or the line-of-sight mode relative to the different camera orientations. The exposure control mode can be set to, for example, a fast shutter speed or to a low shutter speed relative to the different camera orientations. The light measurement control mode can be set to, for example, a multi-light measurement mode, a spot-light measurement mode, or to a center-weighted measurement mode relative to the different camera orientations. When the camera orientation is changed, the photographer can immediately perform photography (i.e., without manually changing the photographic settings) because the camera controller automatically changes the photographic settings (if necessary) based upon the photographic settings recorded in memory for the particular camera orientation.

The photographer can record the photographic settings in memory relative to the different camera orientations, or the camera manufacturer can record the photographic settings in memory relative to the different camera orientations. Alternatively some photographic settings (such as, for example, the exposure control mode and the light measurement control mode) can be stored by the camera manufacturer, while other photographic settings (e.g., the distance area selection mode) can be stored by the photographer.

BRIEF DESCRIPTION OF THE DRAWINGS

The invention will be described in conjunction with the following drawings in which like reference numerals refer to like elements and wherein.

DETAILED DESCRIPTION OF PREFERRED EMBODIMENTS

Figure 1:
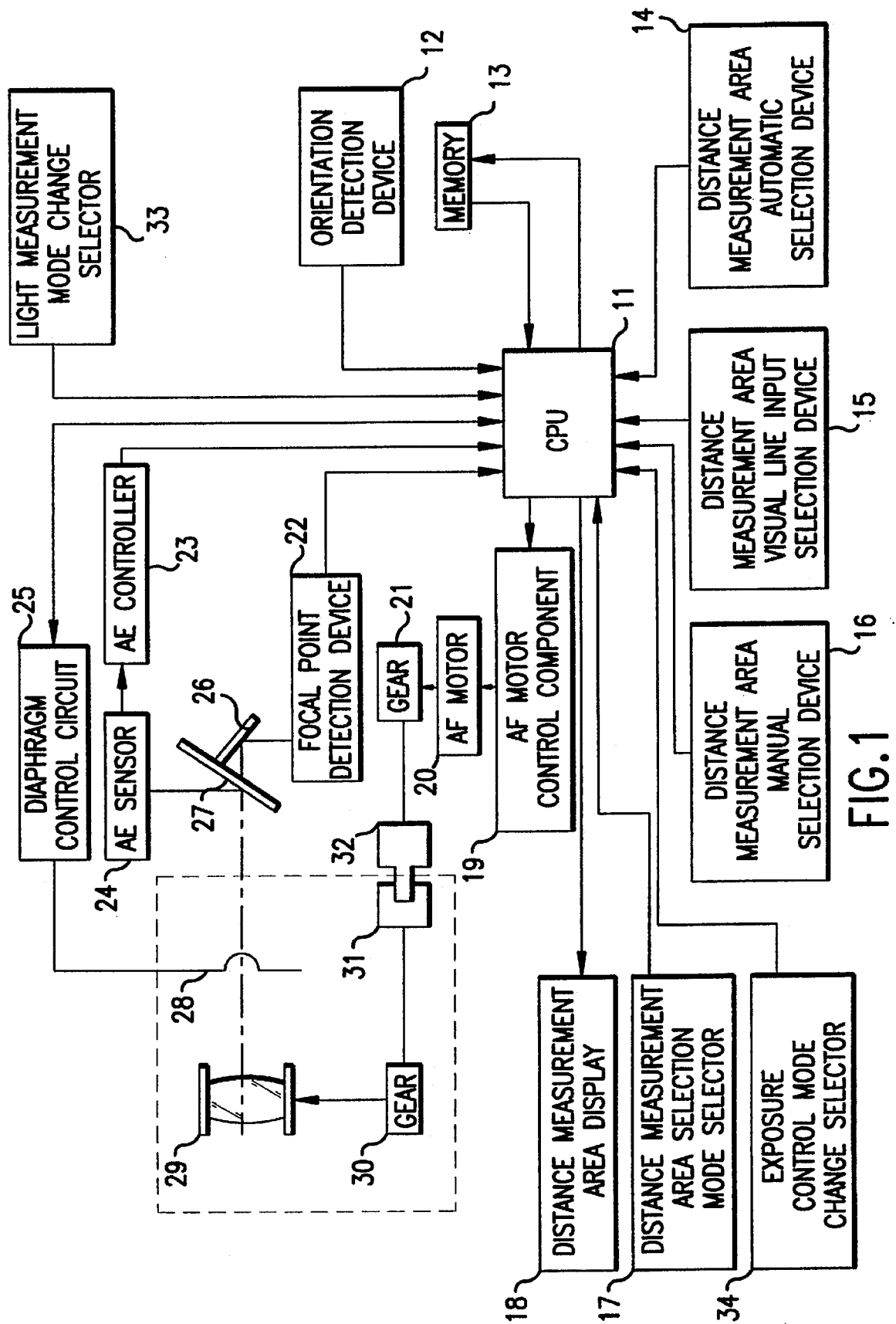
FIG. 1 is a block diagram that shows the structure of an embodiment of a camera according to the present invention.

Referring to the drawings, and in particular to FIG. 1, a gear 30 is operatively connected with, and transmits the focus driving force to, a focus lens 29. The gear 30 is rotationally driven and disposed to engage a coupling 31 within the photographic lens. The coupling 31 also engages a body coupling 32 on the body of the camera. The body coupling 32 further engages a gear 21 within the body, and the gear 21 engages an AF motor 20. An AF motor control component 19 drivingly controls the AF motor 20 according to control instructions sent from a controller such as CPU 11.

A diaphragm control circuit 25 follows the control instructions from the CPU 11 and drivingly controls a diaphragm 28 disposed within the photographic lens. The diaphragm control circuit 25 instructs the diaphragm 28 to open or close. A portion of the light line that passes through the photographic optical system is transmitted through a main mirror 27. The remainder of the light is reflected through the camera body to the viewfinder system. The reflected light is detected by the automatic exposure sensor (AE sensor) 24 that is disposed near the viewfinder. Exposure values are calculated by an AE controller 23 on the basis of the output of the AE sensor 24 and transmitted to the CPU 11. A submirror 26 reflects the transmitted light rays downwardly, projecting them into a focal point detection device 22 disposed within the body and having a known operation.

The amount of defocus with respect to a particular photographic subject detected by the focal point detection device 22 is transmitted to the CPU 11. Defocus is the distance over which the lens telescopes when the camera is executing an autofocus routine. For example, if a camera lens in a first position previously focused for a distance of five feet is subsequently aimed at another subject at a distance of twenty five feet, the lens of the camera will telescope to a second position. The difference between the first position and the second position is the amount of defocus. With automatic focus, the defocus amount is converted to the amount of drive of the motor 20 by the CPU 11, and transmitted to the AF motor control component 19 to drive the AF motor 20. The driving force of the AF motor 20 is then transmitted to the side of the photographic lens side through the gear 21, the body coupling 32, and the coupling 31, thereby moving the focus lens group along the optical axis to focus the camera.

Of course, the invention is applicable to cameras that perform autofocus any number of ways. For example, rather than determine an amount of defocus between a current lens position and a lens position necessary to focus on an object, it is also possible to use an autofocus technique that first determines the distance to a photographic subject (for example, using infrared light beams), and then moves the lens to a position appropriate for the detected distance.

As shown in FIG. 1, an orientation detection device 12 is connected to the CPU 11. The orientation of the camera, i.e., whether the camera is in the horizontal or vertical position, is detected by the orientation detection device 12 and transmitted to the CPU 11. The orientation detection device can be, e.g., a mercury switch or other appropriate circuitry or mechanism that outputs different signals depending upon the orientation of the camera. One such mercury switch device is shown in the above referenced Japanese Laid-Open Patent Application No. 2-64513.

The CPU 11 is also connected to a light measurement (photometry) mode change selector 33. The light measurement mode change selector 33 permits the photographer to select from among several modes of measuring light, including: (i) spot light (single point) measurement, (ii) multi-light (multi-point) measurement, and (iii) center-weighted (multi-point) light measurement modes. An exposure control mode change selector 34 for changing between the auto program, the auto diaphragm priority, the auto shutter priority, and manual or custom program exposure modes, is also connected to CPU 11. Other devices, such as a distance measurement area manual selection device 16, a distance measurement area visual line input selection device 15, and a distance measurement area automatic selection device 14, as well as a distance measurement area selection mode change selector 17, are also connected to the CPU 11.

The distance measurement area selection mode change selector 17 designates either the distance measurement area automatic selection device 14, the distance measurement area visual line input selection device 15, or the distance measurement area manual selection device 16. The designated selection device becomes enabled and permits selecting a particular distance measurement area. The selection results are displayed in a display window 5 and in the viewfinder 9 (FIG. 5) by a distance measurement area display 18. A memory 13 is connected to the CPU 11 for recording the photographic settings that are provided to the CPU 11 from each of the mode change selectors 17, 33, and 34, or the various distance measurement area selection devices 14–16, in correspondence with the orientation received from the orientation detection device 12 as will be detailed below.

Photographic settings with respect to any of the various modes that are affected by camera orientation may be recorded in memory 13 in correspondence with the different camera orientations. Then, when the camera is in a particular orientation, photography is performed according to the photographic settings stored for that orientation.

The exposure control mode can be designated according to the type of photography for which the camera will generally be used. One of the exposure control modes is the program mode, which consists of the high-speed and low-speed program submodes. In one example, it may be appropriate to store the high-speed submode in memory 13 in correspondence with the horizontal camera position and the low-speed submode in memory 13 in correspondence with the vertical camera position. When the program mode is designated, the camera controller 11 selects the high-speed program submode if the camera is in the horizontal position and selects the low-speed program submode if the camera is in the vertical position. The fast shutter speed of the high-speed program submode is appropriate for action photography of, e.g., sporting events, in which the horizontal camera position is used most frequently. The slower shutter speed of the low-speed program submode is more appropriate for still or portrait photography in which the vertical camera position is most frequently used.

Figure 5:
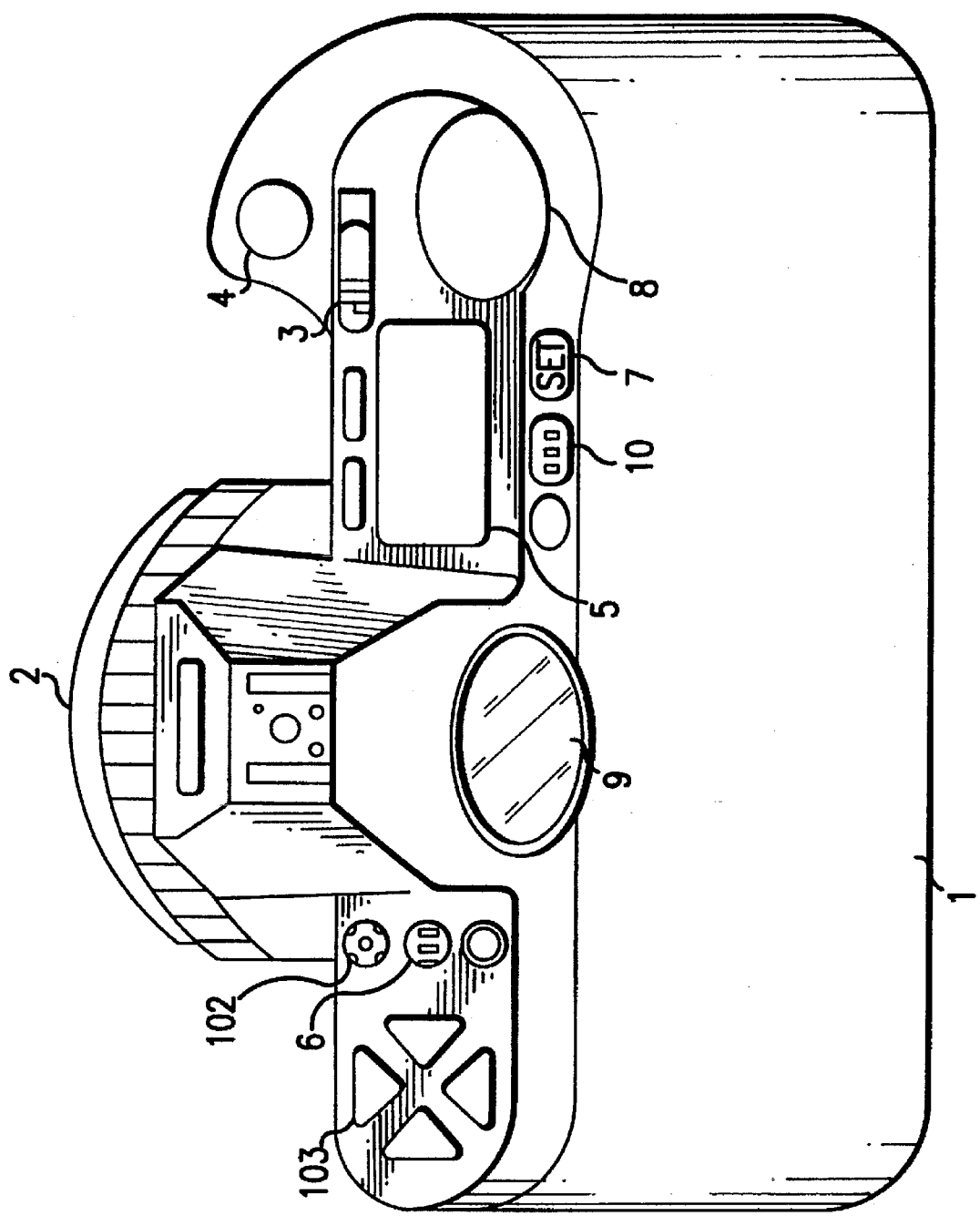
FIG. 5 is an oblique pictorial view showing the exterior of a camera according to the present invention.

The established exposure control mode can be changed by actuating the exposure control mode selector 34. In one embodiment, as shown in FIG. 5, the established exposure control mode is changed by turning the command dial 8 while depressing the exposure mode button 103. The changed exposure control mode can be recorded in memory 13 (thus changing the recorded photographic setting for that particular camera orientation) or the changed exposure control mode can be used only for a single photograph (thus, overriding the recorded photographic setting for a single photograph). Accordingly, with one aspect of the invention, the determination as to whether the camera is in the high-speed submode or in the low-speed submode is based on the orientation of the camera.

Similarly, the light measurement mode can be selected and established according to the orientation of the camera by recording a light measurement mode in memory 13 in correspondence with a particular camera orientation. In one example, when the light measurement mode is established, the camera can use multi-light measurement if the camera is in the horizontal position, and spot-light or center-weighted light measurement if the camera is in the vertical position. The established light measurement mode can be changed by depressing a light measurement mode button 102.

The various modes, including distance measurement area selection, exposure control, and light measurement, can be pre-established by the manufacturer for each camera orientation. In this situation, the pre-established settings are stored in the memory 13 when the photographer purchases the camera. The pre-established settings are chosen according to common photography situations, and thus serve as appropriate default values. The photographer, however, may override the pre-established settings and select the photographer's own preferred settings for each photograph if desired.

Figure 2:
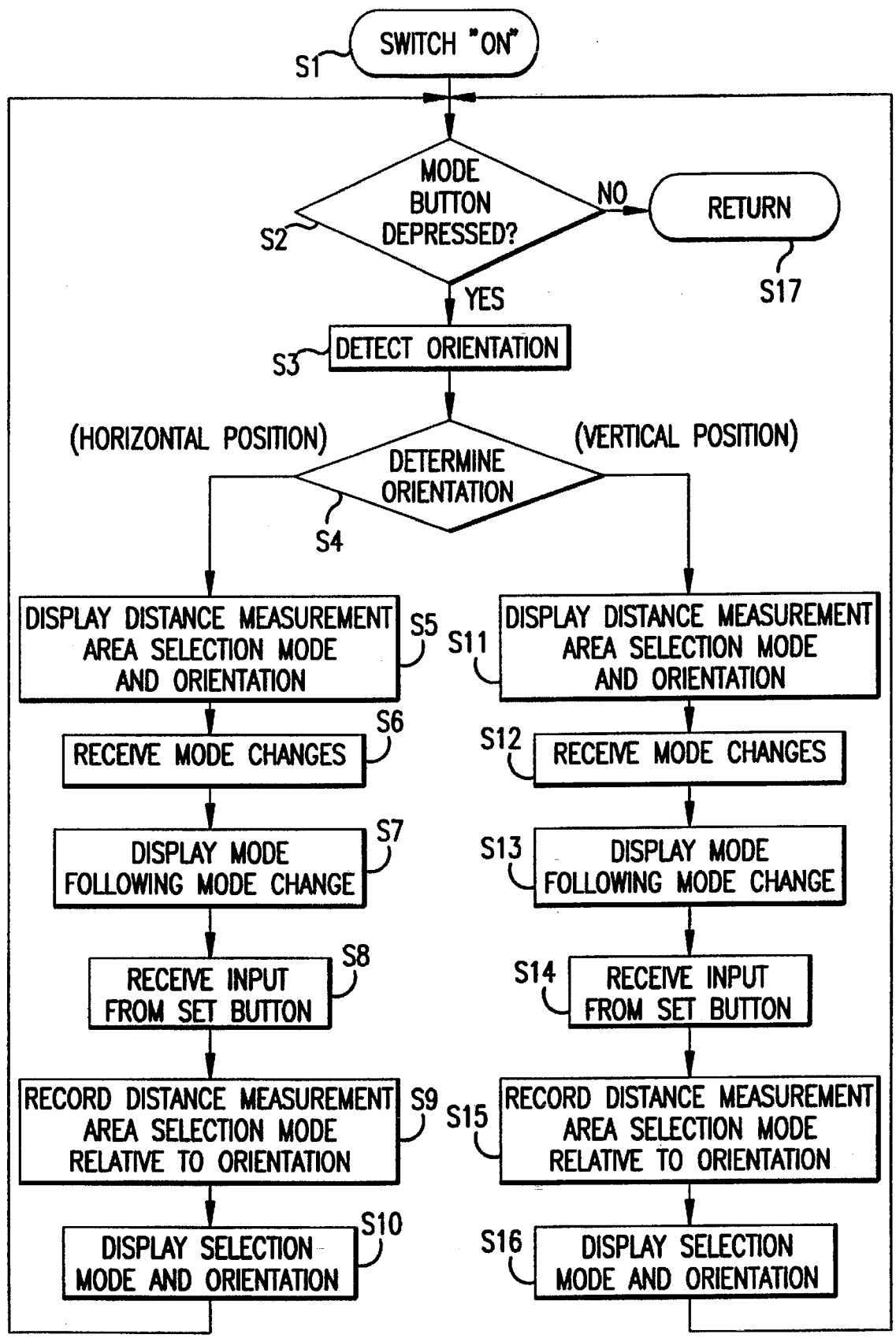
FIG. 2 is a flow chart that depicts the operation of a first embodiment of a camera according to the present invention.
Figure 3:
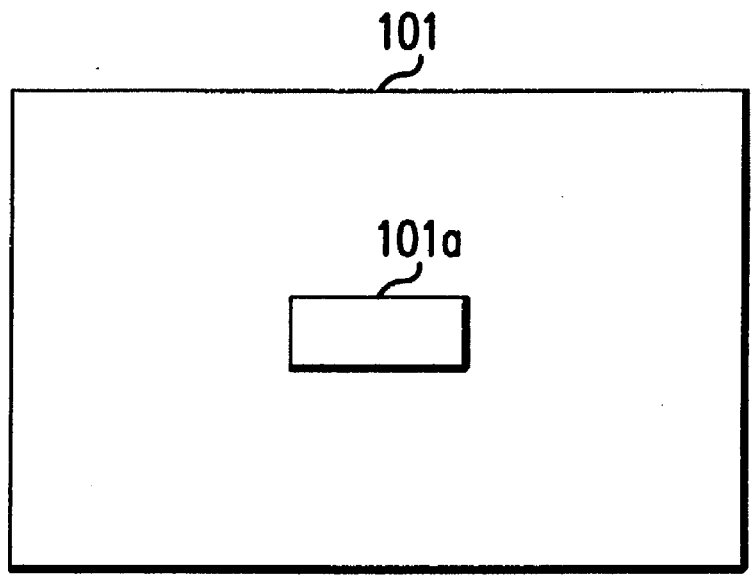
FIG. 3 is an explanatory diagram that depicts a single distance measurement area as seen by a photographer looking through the viewfinder of a conventional camera.

The operation of a first embodiment of the present invention is depicted in FIG. 2. In this first embodiment, the photographer records settings for the distance measurement area selection mode in memory 13 in correspondence with the different camera orientations. However, as detailed above, it is possible to record other photographic settings in memory as well.

The FIG. 2 flow chart commences when the camera power switch 3 is moved to the "on" position (step S1). In step S2, the CPU determines whether the distance measurement area selection mode button 6 of the camera is being depressed. If the distance measurement area selection mode button 6 is not being depressed, then the CPU proceeds to step S17, and the camera returns to normal operation.

If the distance measurement area selection mode button 6 is being depressed, then the CPU 11 detects the orientation of the camera by activating the orientation detection device 12 provided within the camera. In step S4, the orientation of the camera is determined: if the camera is in the horizontal position, the CPU proceeds to step S5; if the camera is in the vertical position, the CPU proceeds to step S11.

In step S5, the CPU displays the current distance measurement area selection mode and the orientation of the camera (i.e., the display indicates that the camera is in the horizontal position). In step S6, the CPU receives any changes to the distance measurement area selection mode. For example, the distance measurement area selection mode can be changed by rotating the command dial 8 while the distance measurement area selection button 6 is being depressed.

Figure 4:
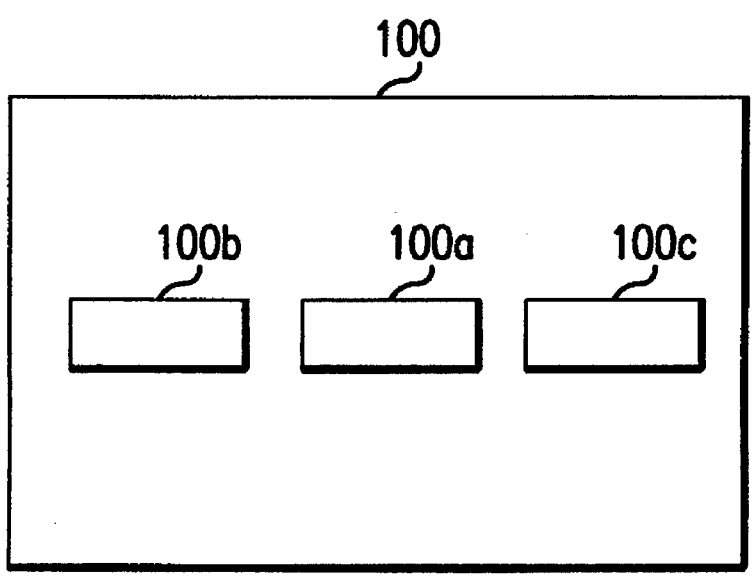
FIG. 4 is an explanatory diagram that depicts the multiple distance measurement areas of both the prior art and the present invention as viewed by a photographer looking through the viewfinder of a camera.

As outlined above, one of three possible distance measurement area selection modes can be selected. The choice of modes includes the automatic selection mode, the manual selection mode, and the visual line input selection mode. According to the present embodiment, the selected distance measurement area selection mode can be changed by rotating the command dial 8 through the selection mode sequence of automatic selection, visual line input selection, and manual selection until the desired mode is displayed. In step S7, the CPU 11 displays the selected mode in the viewfinder 100 (FIG. 4) and the display window 5 (FIG. 5). At this time, if a change is made from automatic to manual selection, for example, by rotating the command dial 8, the distance measurement area 100a is selected (FIG. 4) and the CPU 11 lights the distance measurement area 100a in the viewfinder 100 by an LED. The photographer is also provided with a display in the display window 5. If the command dial 8 is rotated further while pressing the area establishment input button 10, then either of the distance measurement areas 100b and 100c can be selected, respectively. Each of these areas is respectively lit and displayed in the display window 5. Further rotation of the command dial while pressing the distance measurement area selection mode button 6 as detailed above completes the sequence and causes the automatic selection mode to be displayed.

Once the desired mode is displayed in step S7, the photographer selects the mode currently being displayed by depressing the set button 7. The CPU 11 receives the input of the set button 7 (FIG. 5) in step S8, and then the newly established distance measure area selection mode and the orientation of the camera are recorded in the memory 13 (step S9). In step S10, the CPU 11 displays the distance measurement area selection mode and camera orientation (i.e., horizontal position) in the display window 5, and the viewfinder 9.

If the camera orientation determined in step S4 is found to be the vertical position, then the program moves to step S11 and the CPU displays the distance measurement area selection mode and the orientation (i.e., the display indicates that the camera is in the vertical position). Steps S12–S16 correspond to the steps S6–S10 as set forth above describing the operation of a camera in the horizontal position.

The operation of the camera once a particular distance measurement area selection mode has been established and recorded will now be explained. In a first situation, the automatic distance measurement area selection mode has been established and recorded in memory 13 for the particular camera orientation. When the photographer desires to take a photograph and depresses a camera release button 4 (FIG. 5) halfway, the photographic settings, according to whether the camera is in a horizontal or vertical position, are transmitted to the CPU 11 and a command is issued to accomplish multiple point distance measurement (assuming this is the established setting) with regard to the focal point detection device 22. The focal point detection device 22 then executes the multiple point distance measurement procedure. Once the procedure is complete, the focal point detection device 22 transmits distance measurement data to the CPU 11, which automatically selects the particular distance measurement area (100a–100c) to be used on the basis of this data and displays the area in the viewfinder 9 and display window 5 (FIG. 5). The CPU 11 instructs the AF motor controller 19 to focus on the photographic subject within the automatically selected distance measurement area and sends the necessary signal to drive the AF motor 20. The driving force of the AF motor 20 is transmitted to the lens through the gear 21, the body coupling 32 and the coupling 31, moving the focusing lens group along the optical axis to focus the camera.

In a second situation, the manual selection mode has been established and recorded for the particular camera orientation. When the photographer desires to take a photograph and depresses the camera release button 4 halfway, the photographic settings, according to whether the camera is in the horizontal or vertical orientation, are transmitted to CPU 11. Because the manual selection mode is recorded in memory 13 for the camera orientation, the photographer must manually select one of the areas 100a–100c. The distance measurement area is selected by depressing the area establishment input button 10 and rotating the command dial 8 of as detailed above. The selected distance measurement area is transmitted to distance measurement area manual selection device 16 and displayed within the viewfinder 9 and the display window 5 (FIG. 5). An instruction to execute the distance measurement procedure is then transmitted to the focal point detection device 22 by the distance measurement area manual selection device 16. The focal point detection device 22 then executes the distance measurement procedure with respect to the selected area. The focal point detection device 22 sends the distance measurement data to the CPU 11. According to this data, the CPU 11 sends an instruction to the AF motor controller 19 to focus on the subject within the selected distance measurement area and a signal is transmitted to drive the AF motor 20.

In a third situation, the visual line input selection mode has been established and recorded for the particular orientation. According to this mode of distance area measurement, a particular distance measurement area is selected by looking at it as it appears in the viewfinder 100 while depressing the release button 4 halfway. An instruction to measure the distance for the selected area is then transmitted to the focal point detection device 22 by means of the visual line input selection device 15. The focal point detection device 22 then measures the distance for the selected area. The focal point detection device 22 sends the distance measurement data to the CPU 11. The CPU 11 sends an instruction to the AF motor controller 19 to focus on the subject within the selected distance measurement area and the necessary drive signals are sent to the AF motor 20.

Figure 6:
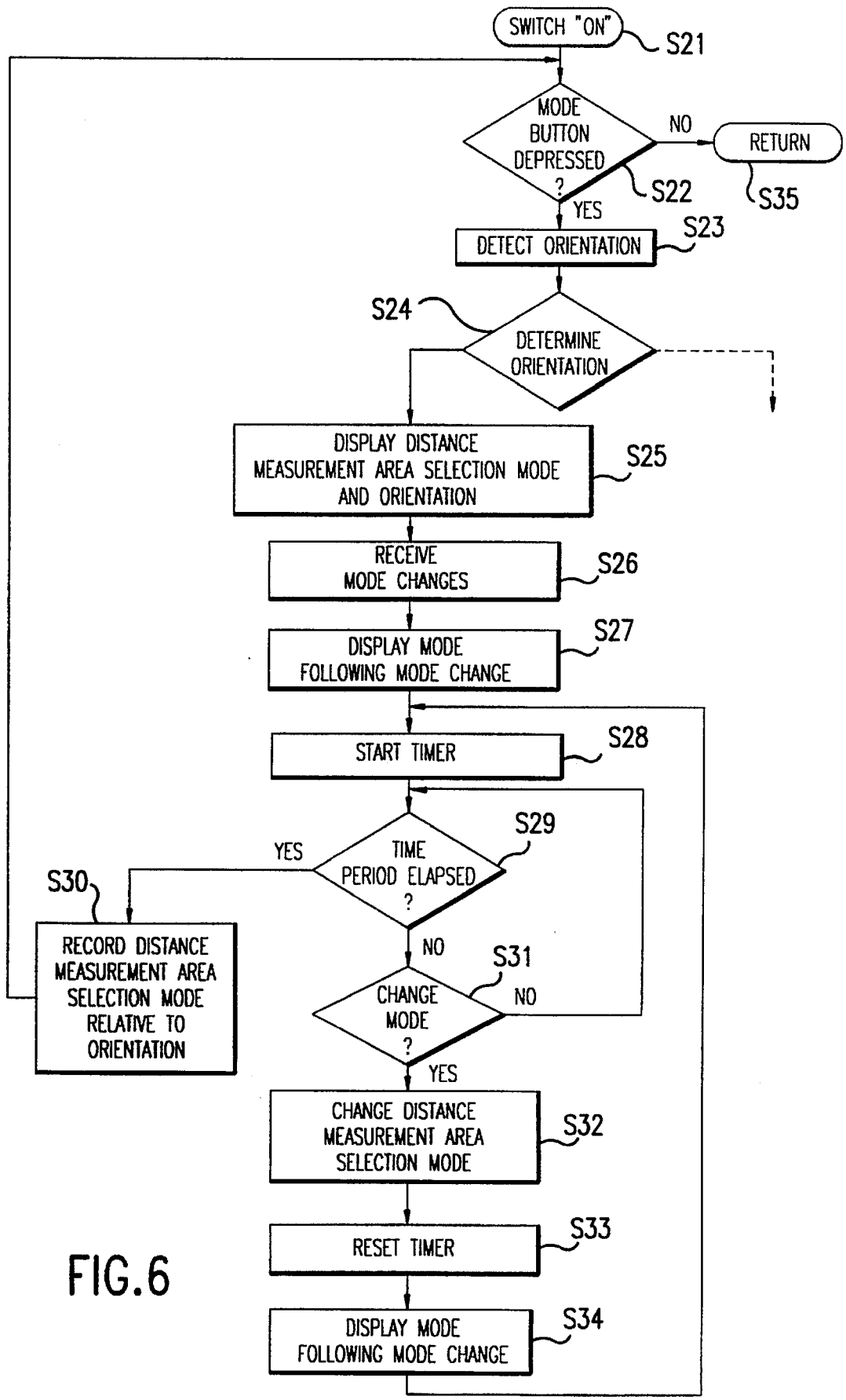
FIG. 6 is a flow chart that shows a second embodiment of a camera according to the present invention.

FIG. 6 is a flow chart that shows a second embodiment of a camera according to the present invention. The program shown in FIG. 6 starts when the power switch 3 of the camera is moved to the "on" position (step S21). In step S22, the CPU determines whether the distance measurement area selection mode button 6 is being depressed. If the distance measurement area selection mode button 6 is not being depressed, the program moves to step S35 and the camera returns to normal operation.

If the distance measurement area selection mode button 6 is being depressed, the CPU 11 detects the orientation of the camera by activating the orientation detecting device 12 (step S23). In step S24, the CPU determines the orientation of the camera. If the camera is in the horizontal position, the program progresses to step S25.

In step S25, the CPU displays the currently recorded distance measurement area selection mode and the orientation (i.e., the display indicates that the camera is in the horizontal position) at the time shown in the viewfinder 100. In step S26, the CPU 11 receives any changes in the setting of the distance measurement area selection mode. As explained above, the distance measurement area selection mode can be changed by rotating the command dial 8 while depressing the distance measurement area selection mode button 6. The various distance measurement area selection modes are displayed in the viewfinder 100 and the display window 5 in the sequence of automatic selection, visual line input selection, and manual selection.

According to this embodiment, there is no need to depress a set button on the back surface of the camera while depressing the distance measurement area selection mode button 6 to record the distance measurement area selection mode in memory 13. Rather, this aspect is accomplished by a time set feature. In other words, following the display of the distance measurement area selection mode in step S27, the CPU 11 starts the count of the timer (step S28), and after a specified length of time has elapsed (step S29), the current distance measurement area selection mode is established and recorded (step S30).

The CPU 11, within a specified amount of time, receives changes to the camera settings in steps S31 and S32. At this time, in order to change the distance measurement area selection mode, the distance measurement area selection mode change selector 17 is actuated (the command dial 8 is rotated while the distance measurement area selection mode button 6 is depressed). If the distance measurement area selection mode change selector 17 is depressed, the CPU 11 resets the timer (step S33), and the distance measurement area selection mode is changed. In step S34, the CPU 11 displays the selection mode, the program is returned to step S28, and the timer is reset. This sequence continues until the desired distance measurement area selection mode is established and recorded.

During photography, the distance area selection mode established and recorded in step S30 is communicated to the CPU 11 when the camera release button 4 (shown in FIG. 5) is depressed halfway, at which point an instruction is transmitted to the focal point detection device 22 directing it to accomplish distance measurement. The program follows the steps of the first embodiment as explained above until the focusing procedure is completed. If the CPU determines that the camera is in the vertical position, a series of steps (not shown) corresponding to steps S25 to S34 as described above is followed.

According to the embodiment explained above, even when it is desirable for the distance measurement area selection mode, or the light measurement mode, or the exposure mode to be changed (since each of these three modes can be pre-set according to the orientation of the camera) when the camera is changed between the horizontal position and the vertical position, there is no need to manually change the mode selections when the camera orientation is subsequently changed. Therefore, focusing can be accurately accomplished on the subject intended by the photographer, and the intended exposure value can be obtained, without any need for special operations and without concern about wasting film.

The invention can be used to record photographic settings other than those described for different camera orientations. Additionally, settings can be recorded for orientations other than or in addition to the vertical and horizontal orientations, although the vertical and horizontal orientations are most commonly used.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A camera capable of performing photography in different orientations comprising:

an establishment device that establishes at least one photographic setting used to perform photography for each orientation, wherein the at least one photographic setting includes a distance measurement area selection mode and the establishment device includes a setting device that sets a set distance measurement area selection mode from a plurality of available distance measurement area selection modes that includes an automatic distance measurement area selection mode, a manual distance measurement area selection mode and a visual line input distance measurement area selection mode;

an orientation detection device that detects the orientation of the camera; and a controller connected to the establishment device and the orientation detection device that controls the camera according to the at least one established setting corresponding to the detected orientation.

2. The camera of claim 1, wherein the establishment device establishes the at least one photographic setting relative to a predetermined orientation.

3. The camera of claim 1, further comprising a memory connected to the establishment device that stores the at least one photographic setting established by the establishment device.

4. The camera of claim 1, further comprising a memory connected to the establishment device that stores the at least one photographic setting relative to said different orientations of said camera.

5. The camera of claim 1, wherein the orientation detection device detects at least a horizontal orientation and a vertical orientation, the horizontal orientation being offset from the vertical orientation by approximately 90°.

6. The camera of claim 1, further comprising a memory that stores the at least one photographic setting established by the establishment device for a particular one of the different orientations when the orientation detection device detects that the camera is in the particular one of the different orientations.

7. A camera capable of performing photography in different orientations comprising:

an establishment device that establishes at least one photographic setting used to perform photography for each orientation, wherein the at least one photographic setting includes an exposure control mode, and the establishment device includes a setting device that sets a set exposure control mode from a plurality of available exposure control modes;

an orientation detection device that detects the orientation of the camera; and a controller connected to the establishment device and the orientation detection device that controls the camera according to the at least one established setting corresponding to the detected orientation.

8. The camera of claim 7, wherein the plurality of available exposure control modes includes a fast shutter speed mode and a slow shutter speed mode.

9. The camera of claim 7, wherein the establishment device establishes the at least one photographic setting relative to a predetermined orientation.

10. The camera of claim 7, further comprising a memory connected to the establishment device that stores the at least one photographic setting established by the establishment device.

11. The camera of claim 7, further comprising a memory connected to the establishment device that stores the at least one photographic setting relative to said different orientations of said camera.

12. A camera capable of performing photography in different orientations comprising:

an establishment device that establishes at least one photographic setting used to perform photography for each orientation, wherein the at least one photographic setting includes a light measurement mode, and the establishment device includes a setting device that sets a set light measurement mode from a plurality of available light measurement modes that includes a multi-light measurement mode, a spot-light measurement mode, and a center-weighted light measurement mode;

an orientation detection device that detects the orientation of the camera; and a controller connected to the establishment device and the orientation detection device that controls the camera according to the at least one established setting corresponding to the detected orientation.

13. The camera of claim 12, wherein the establishment device establishes the at least one photographic setting relative to a predetermined orientation.

14. The camera of claim 12, further comprising a memory connected to the establishment device that stores the at least one photographic setting established by the establishment device.

15. The camera of claim 12, further comprising a memory connected to the establishment device that stores the at least one photographic setting relative to said different orientations of said camera.

16. A method of controlling a camera having an orientation detection device, a photographic setting establishment device, and a control device, said method comprising the steps of:

detecting an orientation of said camera with the orientation detection device;

establishing at least one photographic setting with the photographic setting establishment device based on the orientation, wherein the at least one established photographic setting includes a distance measurement area selection mode from a plurality of available distance measurement area selection modes including an automatic distance measurement area selection mode, a manual distance measurement area selection mode, and a visual line input selection mode; and controlling the camera based upon the at least one photographic setting established by the photographic setting establishment device.

17. The method of claim 16, wherein the camera includes a memory connected to the photographic setting establishment device and the step of establishing includes storing the at least one established photographic setting in the memory.

18. The method of claim 16, wherein the orientation detection device detects a horizontal orientation and a vertical orientation, said horizontal orientation being offset from said vertical orientation by approximately 90°.

19. A method of controlling a camera having an orientation detection device, a photographic setting establishment device, and a control device, said method comprising the steps of:

detecting an orientation of said camera with the orientation detection device;

establishing at least one photographic setting with the photographic setting establishment device based on the orientation, wherein the at least one established photographic setting includes an exposure control mode from a plurality of available exposure control modes; and controlling the camera based upon the at least one photographic setting established by the photographic setting establishment device.

20. The method of claim 19, wherein the plurality of available exposure control modes includes a fast shutter speed mode and a slow shutter speed mode.

21. A method of controlling a camera having an orientation detection device, a photographic setting establishment device, and a control device, said method comprising the steps of:

detecting an orientation of said camera with the orientation detection device;

establishing at least one photographic setting with the photographic setting establishment device based on the orientation, wherein the at least one established photographic setting includes a light measurement mode from a plurality of available light measurement modes including a multi-light measurement mode, a spot-light measurement, and a center-weighted light measurement mode; and controlling the camera based upon the at least one photographic setting established by the photographic setting establishment device.

* * * * *